(12) United States Patent
Halliday et al.

(10) Patent No.: US 7,408,121 B2
(45) Date of Patent: Aug. 5, 2008

(54) SECURE RACEWAY WITH LOCKABLE ACCESS

(75) Inventors: Andrew J. Halliday, Fergus (CA); Kenneth R. Freeman, Jr., Ovilla, TX (US); Paul H. Adams, Monroe, CT (US)

(73) Assignee: The Wiremold Company, West Hartford, CT (US)

( * ) Notice: Subject to any disclaimer, the term of this patent is extended or adjusted under 35 U.S.C. 154(b) by 84 days.

(21) Appl. No.: 11/559,580

(22) Filed: Nov. 14, 2006

(65) Prior Publication Data

US 2008/0110671 A1   May 15, 2008

(51) Int. Cl.
*H02G 3/10* (2006.01)
(52) U.S. Cl. .................. 174/481; 174/68.1; 174/97; 174/72 C; 174/135; 174/49; 439/207; 248/68.1
(58) Field of Classification Search ................ 174/481, 174/492, 68.1, 68.3, 72 C, 97, 72 R, 95, 99, 174/101, 49, 96, 135; 52/220.1, 220.3, 220.5, 52/220.7; 385/100, 134, 135; 248/74.3, 248/68.1, 205.1; 439/207, 209, 210, 211, 439/212, 213
See application file for complete search history.

(56) References Cited

U.S. PATENT DOCUMENTS 5,091,607 A * 2/1992 Stob ........................ 174/496
7,075,010 B2 * 7/2006 Santelli, Jr. ................ 174/72 R
7,193,159 B2 * 3/2007 Makwinski et al. ......... 174/480
7,223,925 B2 * 5/2007 Ewer et al. .................. 174/481
7,345,239 B2 * 3/2008 Tousignant et al. ........ 174/68.1

OTHER PUBLICATIONS

Protective Distribution Systems (PDS), National Security Telecommunications and Information Systems Security, NSTISSI No. 7003; Dec. 13, 1996.
Product Description Guide, Holocom Networks, Holocomnetworks.com.

* cited by examiner

*Primary Examiner*—Dhiru R Patel
(74) *Attorney, Agent, or Firm*—McCormick, Paulding & Huber LLP (57) ABSTRACT

A raceway system having forwardly open channel-shaped base members with opposed longitudinally extending side walls, and the side walls including inwardly and rearwardly projecting marginal edge flanges, the improvement wherein the raceway covers must be slid into these elongated base members to define at least one wireway therebetween, the covers including clips with wing portions adapted for nesting relationship between the base side walls and the base marginal edge flanges, whereby the covers cannot be disassembled from the base members as a result of flexing the base side walls, but must be disassembled by sliding them apart. These clips also include leg portions that extend well inside the base to prevent attempts to push the cover into the base, and thereby spread the base side walls to gain access to the interior wireway(s).

12 Claims, 15 Drawing Sheets

SECURE RACEWAY WITH LOCKABLE ACCESS

BACKGROUND OF INVENTION

This invention relates generally to surface mounted perimeter raceway for the distribution of electrical and data/telecommunication cables in buildings that have a need for Protective Distribution Systems (PDS) as described in National Security Telecommunication and Information Systems Security Instruction No. 7003. This NSA instruction provides guidelines for facility design and installation of data distribution systems in various environments.

While the preferred embodiment of the present invention satisfies these guidelines, the features of the invention may also be applicable to any raceway that must be secured against intrusion, and that can be inspected for the detection of any attempted intrusion, short of that dictated by the needs of the National Security Agency (NSA), and as set forth in publication No. 7003.

Conventional two-piece metal raceway typically includes a channel-shaped base of U-shaped cross-section having opposed longitudinally extending side walls that are adapted to flex in order to allow the raceway cover to be snapped in place on the base. More particularly, the base side walls have inwardly and rearwardly projecting marginal edge flanges that are adapted to receive depending flanges on the back side of the raceway cover for this purpose. Such raceway is sold by Wiremold Co. of West Hartford, Conn., under the following Wiremold trademarks: 4000, 6000, and ANY SIZE two-piece metal raceway.

SUMMARY OF INVENTION

In a presently preferred embodiment of the invention, a channel-shaped raceway base having a cross-section similar to that described above, that is having opposed relatively flexible side walls with longitudinally extending inwardly and rearwardly projecting marginal edge flanges, is provided in standard lengths. Each such base member has, at one end an overlap coupling spot welded to the raceway base, and at the opposite end is configured to receive such a coupling on an adjacent base member. Thus, interlocking of these base members as they are mounted on a wall structure is the first step in the installation process.

Raceway covers are so configured as to preclude snap fitting of the cover onto these base members, and instead the covers are designed so that the cover must be slid into the base member at assembly in a subsequent step of the installation process.

Once installation of these raceway covers into associated base members is provided on a wall surface it is not possible to spread the base side walls apart and pull the cover off the base as in prior art 4000 raceway. This design requires sliding of each cover through an open end of each raceway base for access.

The present invention also contemplates provision for a mid-span box of sufficient length to receive a raceway cover at the mid-span box and then sliding the covers outwardly of the mid-span box onto the base member. The end portions of the mid-span box are designed for mating with either the male or female end of the adjacent raceway base members.

As with the base, the raceway covers are provided with overlap coupling elements spot welded to one end of each cover, and each cover is configured at the opposite end to receive such a cover coupling element of an adjacent cover. This configuration prevents access to the interior wireway or wireways within the raceway once the raceway covers have been assembled with the raceway base members.

Each raceway cover further includes clips, integrally formed or spot welded to the underside of the raceway cover, along its marginal edges. These clips include longitudinally spaced wing portions that project through openings provided for this purpose in the rearwardly projecting flanges of the cover so that the raceway cover must be slid into the base member and not snapped onto the base. The wing portions of the cover clips nest behind the inwardly and rearwardly directed flanges of the base, precluding removal of the cover except by the same sliding motion of the cover relative to the base member as used at installation. These clips also provide greater rigidity for the cover itself.

The clips further include projecting leg portions that extend well inside the base members and terminate in closely enough spaced relationship to the inner or rear wall of the base member so as to preclude any possibility of the raceway cover being forced inwardly of the raceway base, thereby preventing unauthorized access to the wireway(s) defined between the raceway cover and base member.

Authorized access to the wireway or interior of the assembled raceway is then limited to the aforementioned mid-span box. Drop out fittings are provided at selected locations along the raceway for feeding of power and data/communication lines to selective workstations. Access to the interior of the assembled raceway base and cover at these drop out fitting locations is preferably limited so that these cables run through the rear wall of the base, to preclude unauthorized wireway access.

The drop out fitting comprises an L-shaped housing which provides communication between the interior of the raceway and the interior of the L-shaped housing. The L-shaped housing is in turn welded to a square metal tube in order that wiring from within the raceway may be carried through the rear wall of the base into the L-shaped housing and then through the welded tube to a work station or the like.

It is a further feature of the present invention that the raceway be provided in a "stand-off" relationship to the wall surface from which it is supported. This configuration for the raceway allows inspection of the raceway, not only from the front, but also allows inspection of the back side of the raceway (a requirement under the abovementioned NSA publication).

Finally, the raceway base and cover assembly can be finished with a termination box that includes an open end portion for receiving the end of the raceway. The termination box further includes a lockable cover so as to provide authorized access only to the raceway run.

BRIEF DESCRIPTION OF THE DRAWINGS

FIG. 11 shows the assembled raceway base member and cover together with a drop out fitting box and associated conduit for providing wiring from within the raceway to a workstation of the like.

DETAILED DESCRIPTION

Turning now to the drawings of the preferred embodiment as disclosed in FIGS. 1-24, the components of the raceway will now be described in detail.

Figure 1:
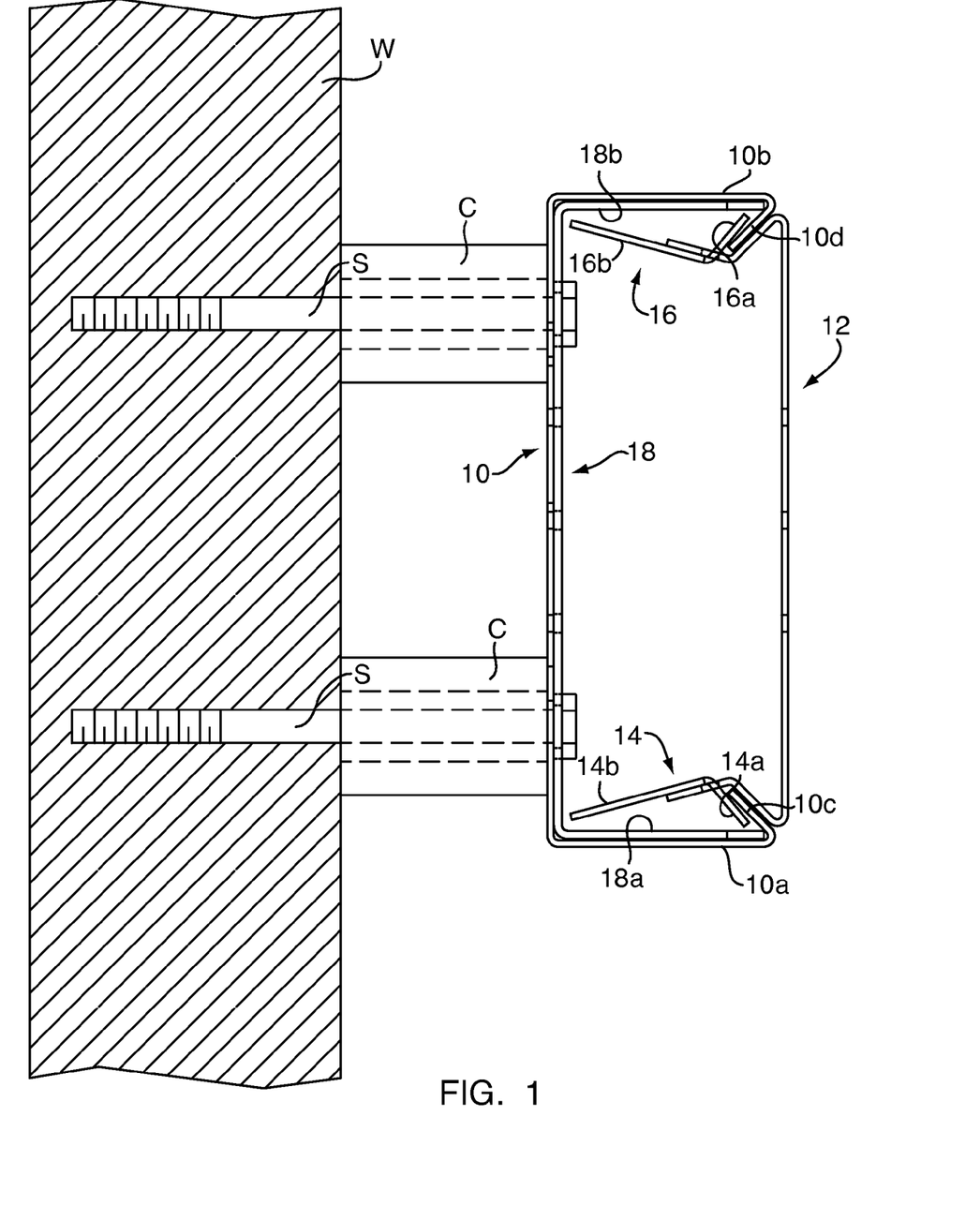
FIG. 1 is a cross-section through the raceway base member, and illustrates the mounting screws and stand-off collars for providing the assembled raceway in a position that allows for inspection 3600 around the raceway assembly in order to detect any unauthorized entry or attempts at entry to the wireway there within.

FIG. 1 shows a wall structure W that represents the perimeter of the space within which a raceway of the present invention is to be used. Mounting screws S,S are anchored in the wall structure W, by any secure well-known method, and access to these screws is confined to the interior of the raceway of the present invention. Once the raceway assembly has been installed as shown, access is precluded.

Standoff collars C,C are provided on these screws S,S to provide visual access to the rear of the raceway after it has been so mounted on the wall structure W. This configuration allows periodic inspection of the raceway to assure that no unauthorized access has been attempted or achieved.

Figure 4A:
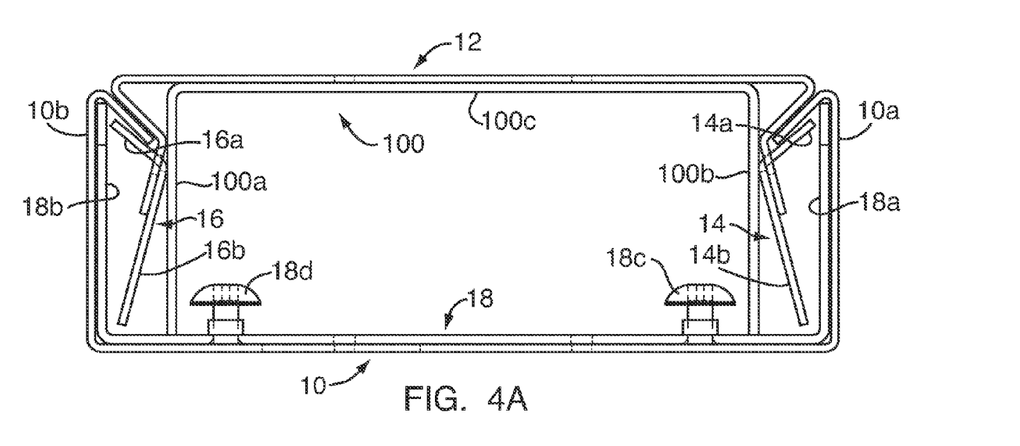
FIG. 4A is similar to the sectional view of FIG. 4, but also shows a U-shaped reinforcing clip 100.
Figure 4B:
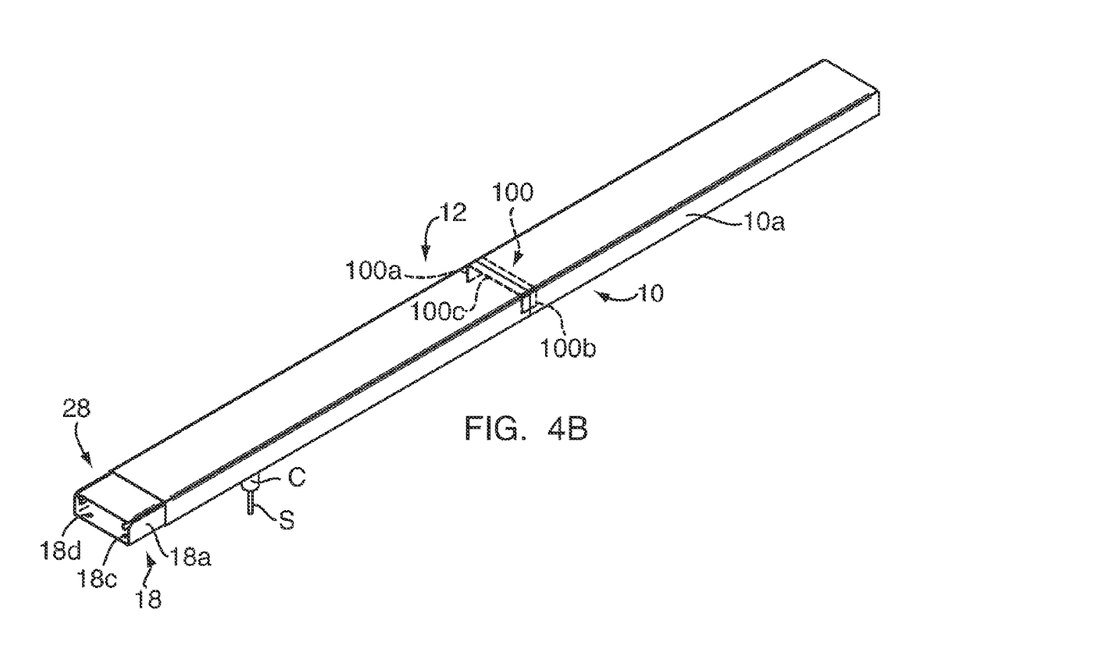
FIG. 4B shows the clip 100 at the junction or seam between two end-to-end cover components.
Figure 5:
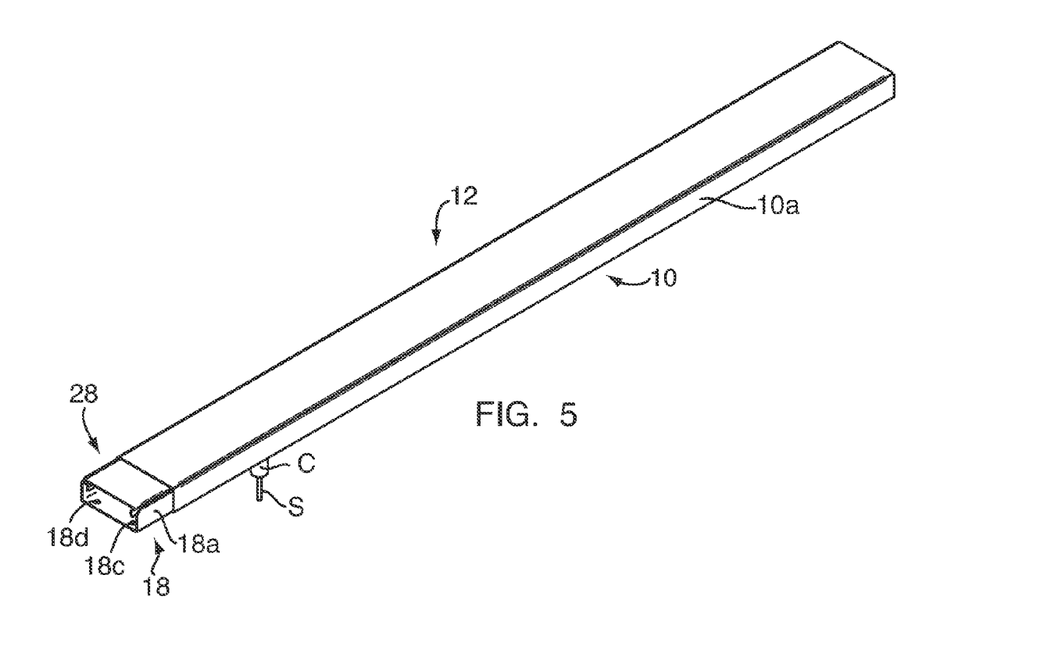
FIG. 5 is a view of the raceway base and cover members after the later has been slip into the former so as to provide the cover overlap in its relationship to the base overlap coupling at the "male" end of this subassembly.

In accordance with the present invention, the raceway comprises a base 10 and cover 12, which are designed to be slidably assembled with one another, and it is an important feature of the present invention that each base member preferably has at least one cover associated therewith that results in an assembly such as shown in FIG. 5. Each base member generally will have one cover, but may have more than one as the covers can be shorter than the base. Such a situation can occur, for example, where a cover is cut to fit in a mid span box 20 as described below. By way of example and not limitation, the base components will have a length (L) in the range of 4-6 feet and the covers are preferably 2-3 feet in length so as to have a standard length L/2. Thus, if the base be shortened by less than the length L, one of two covers must be cut for use with a cover L/2 in length, these two covers can be butted together. Such an assembly can benefit from a reinforcing clip at the junction or seam between these covers. See FIGS. 4A and 4B.

Figures 2, 2A, 3:
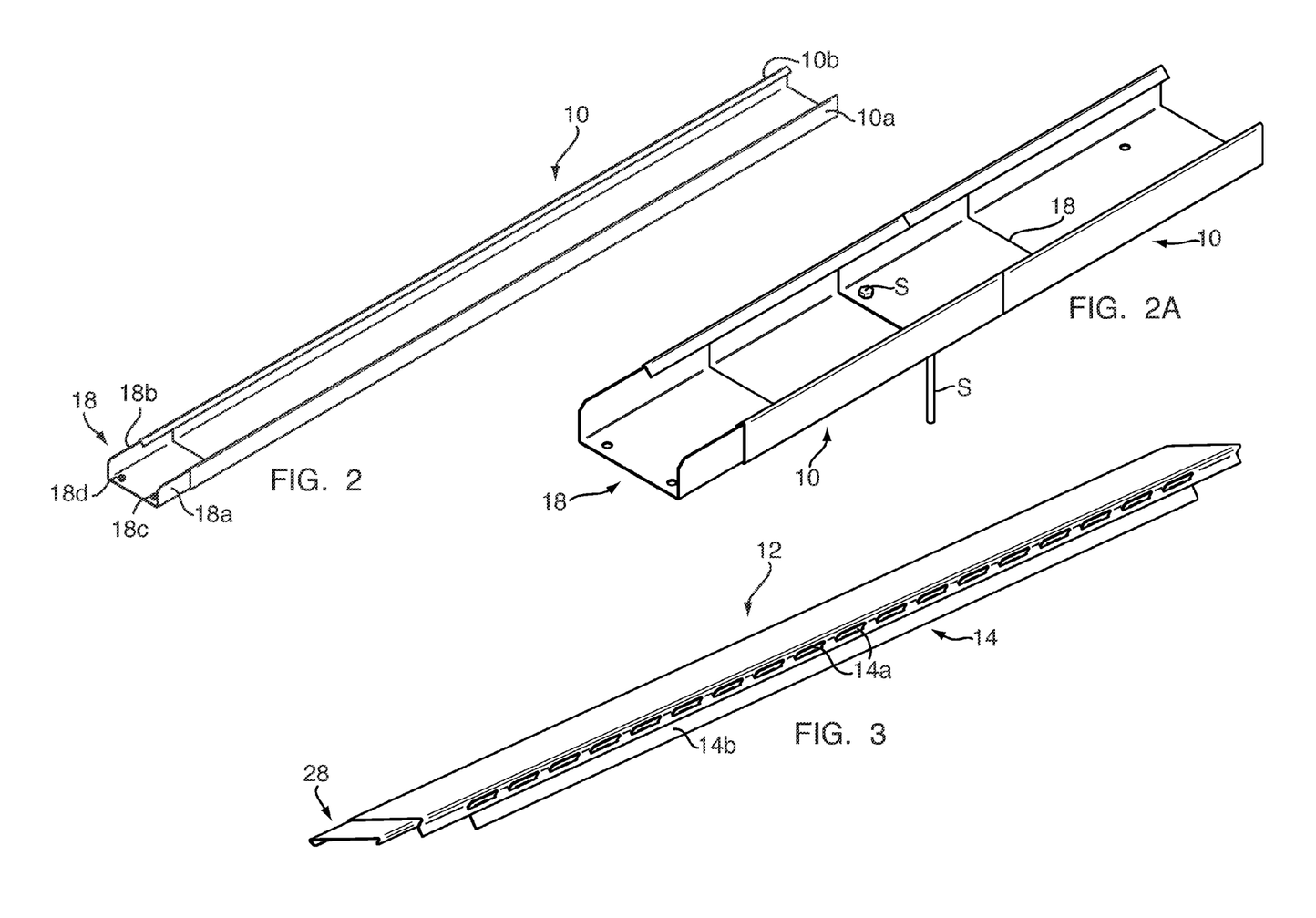
FIG. 2 is a perspective view showing the raceway base member with an overlap coupling provided at one end, and an open opposite end for receiving the coupling of an adjacent raceway base member.
FIG. 2A is a perspective view showing abutting raceway base members, with a coupling 18 at the joint between them, and support screws S,S provided at this compliment.
FIG. 3 is a perspective view of a raceway cover member, the cover member also including a cover overlap coupling at one end and the opposite end being free to receive such a coupling member on an adjacent raceway cover.

FIG. 2 is a perspective view of the raceway base 10, which base has a forwardly open generally channel or C-shaped cross section with forwardly projecting legs 10a and 10b that can be flexed relative to the rear or back wall of the base. Thus, the base 10 may be similar to 4000 Wiremold raceway, for example.

The raceway base 10 is thus similar to prior art two piece steel base, except that base members 10 are preferably designed to fit within one another. Coupler 18 is provided at one end of each base 10 for this purpose. The coupler 18 can be seen from FIG. 2 as including upstanding leg portions 18a and 18b as well as locating posts 18c and 18d designed to receive the opposite, or female end portion of a raceway base 10. As shown coupler 18 is attached to the end of the base 10. Two base members might also be coupled with a clip (not shown) similar to the cover clip 100 (to be described).

Figure 4:
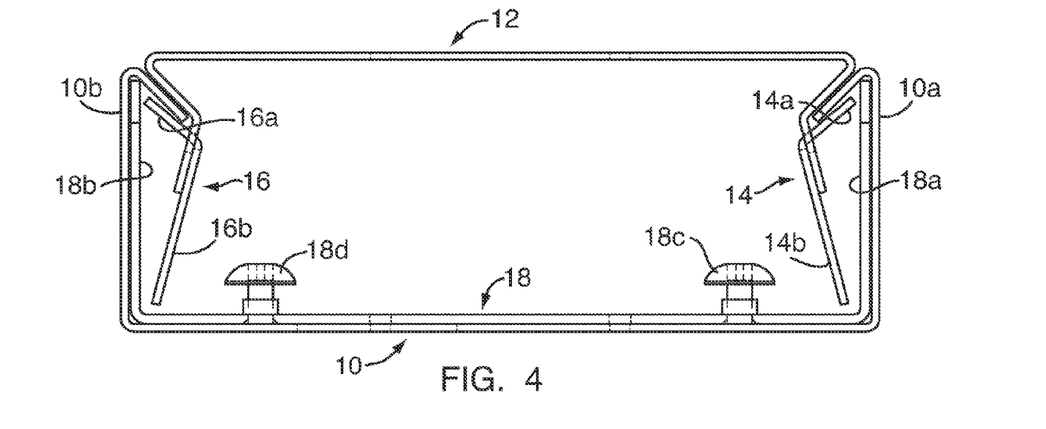
FIG. 4 shows in cross-section the assembled raceway base end cover member, and illustrates the clip construction provided along the marginal edges of the cover flanges, these clip portions defining upper wing portions that nest behind the projecting flanges of the base, and the clip configuration also including depending leg portions extending well within the wireway and terminating adjacent the inside or inner wall of the C-shaped base member.

FIG. 4 shows this feature in greater detail, and illustrates the cover of FIG. 3 mounted in the base 10 as suggested by the assembly of FIG. 5.

FIGS. 4A and 4B show a clip 100 having leg portions 100a and 100b and an intermediate portion 100c that provide a U-shape designed to reinforce the junction or seam between two butting cover components 12a and 12b. Portion 100c of clip 100 supports the underside of both covers to reinforce this assembly.

Figure 3A:
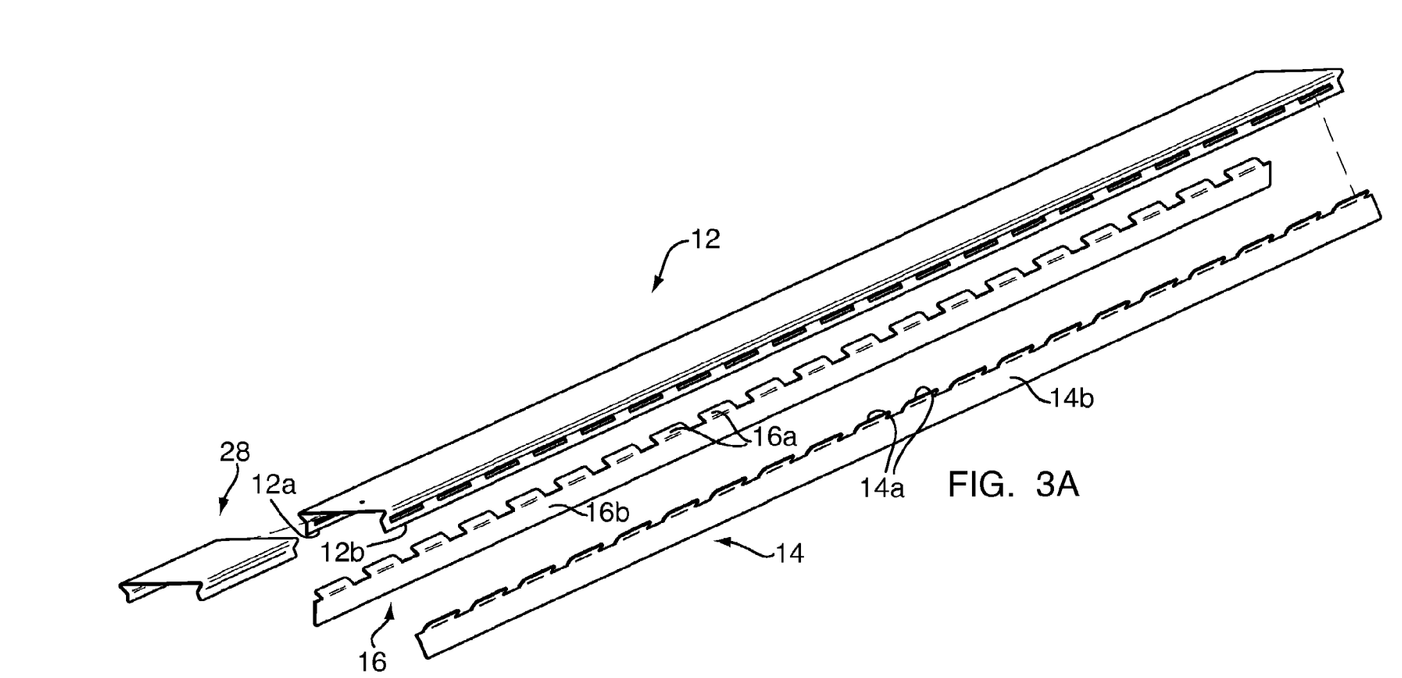
FIG. 3A shows the components that make up the cover of FIG. 3, these components being illustrated in exploded relationship to one another.
Figure 3B:
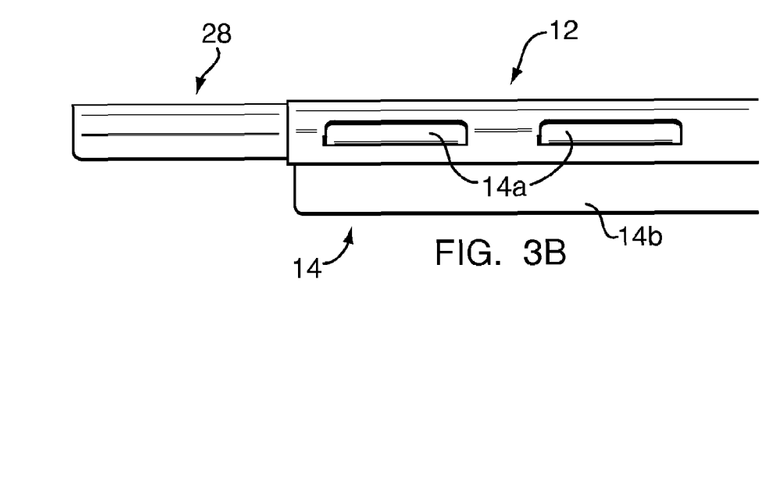
FIG. 3B shows the components of FIG. 3A assembled with one another.

Turning next to a detailed description of the raceway cover 12 of the present invention, FIG. 3A shows the various components of a raceway cover in exploded relationship, each cover 12 including a cover overlap or coupling 28 provided at one end, and an open, or female opposite end, for receiving the coupling element of an adjacent raceway cover. Each cover 12 may be associated with an adjacent raceway base 10, as described above. The cover 12 of FIG. 3A further includes longitudinally extending clips 14 and 16, which clips include projecting wing portions 14a and 16a, respectively, that fit within openings provided for this purpose along the marginal edges of the raceway cover 12. The base 10 has flanges 10c, 10d for slidably receiving raceway cover marginal edges 12a, 12b. FIG. 3B shows these components in assembled relationship, with the wing portions 14a provided in the openings of the cover 12, and with the coupling element 28 provided in place at one end of the cover 12.

These clips 14 and 16 are designed to prevent the cover 12 from any substantial movement relative to the base (save sliding movement as described below). More particularly, the wing portions 14a and 16a prevent prying the cover 12 from the raceway base 10 (in the manner made possible with Wiremold 4000 raceway base) by spreading of the base side walls 10a and 10b. These clips also include projecting leg portions 14b and 16b that extend into the base far enough to prevent the cover from being pushed into the base. These leg portions inhibit disassembly of the cover from its base except by sliding the cover relative its base.

Figures 6, 7:
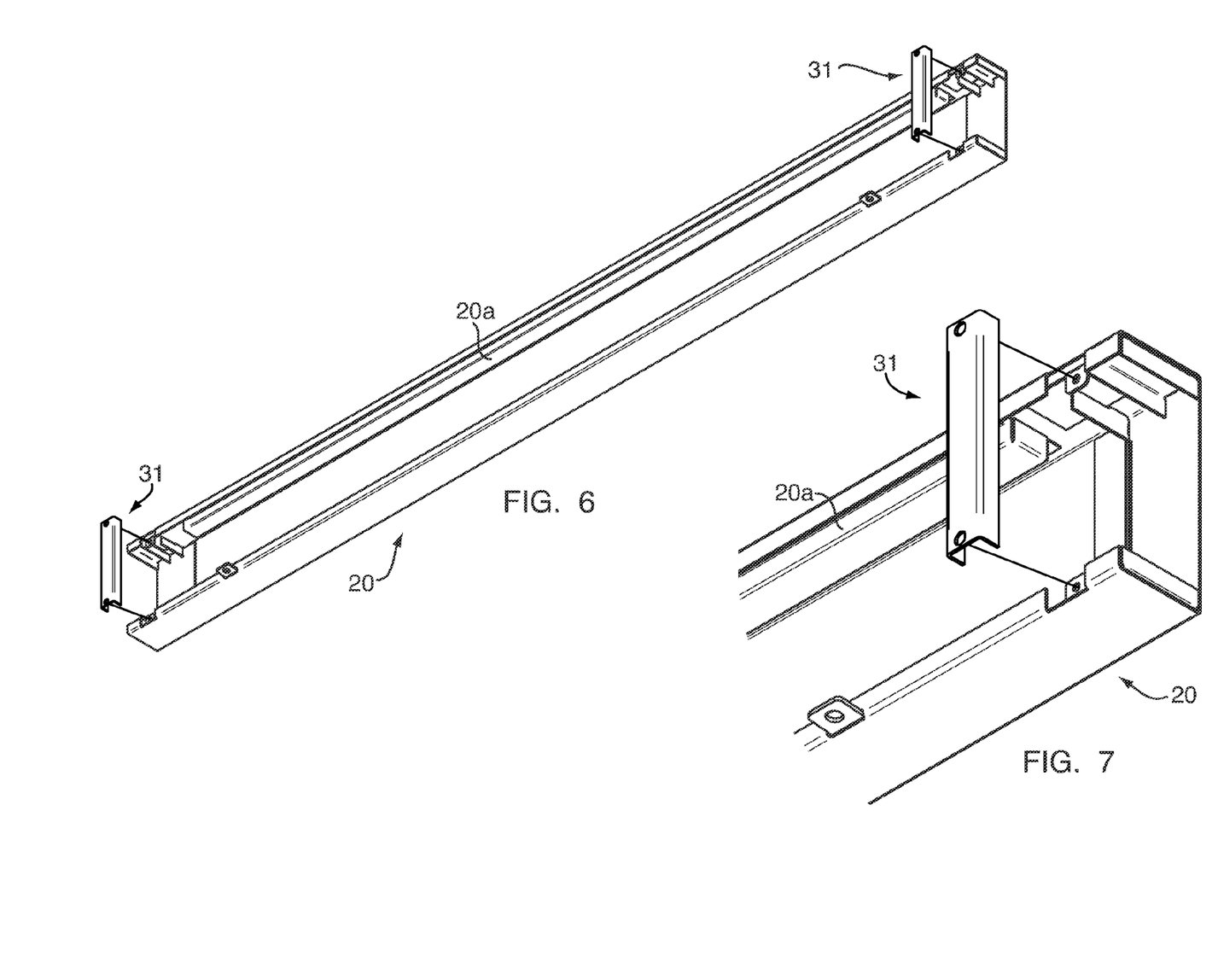
FIG. 6 is a perspective view of the raceway mid-span box base portion as designed to receive each of the raceway covers for slidable assembly with the raceway base members after the base members have been provided on the wall by the stand-off mounting bolts, and after the cabling has been provided inside the wall mounted base members.
FIG. 7 is a detailed view of the left-hand end portion of the mid-span box of FIG. 6, the opposite or right-hand end portion being a mirror image thereof.

In order to install the raceway of the present invention, the base members are mounted in alignment and along the wall, and preferably each raceway cover must be slid in place on its associated base during the process of installation.

Where a wall is so configured as to deny access to the end of a raceway base, a mid-span box such as that depicted in FIG. 6 at 20 is provided. This box 20 is designed so that its opposite end portions can receive raceway base members such as described above, and more importantly, the box 20 is somewhat larger in size than an assembled raceway and covers so that the open front side of the mid-span box 20 can receive these covers. Each cover can be slid into place into an adjacent raceway base. The base need not be of the same length as the cover at the end fitting into the box 20 because the base end is secure without any need for the base coupling 18. Further, the need for a cover coupling at the junction between the box 12 and the assembled cover is obviated as well. See FIG. 17.

Figures 16, 17:
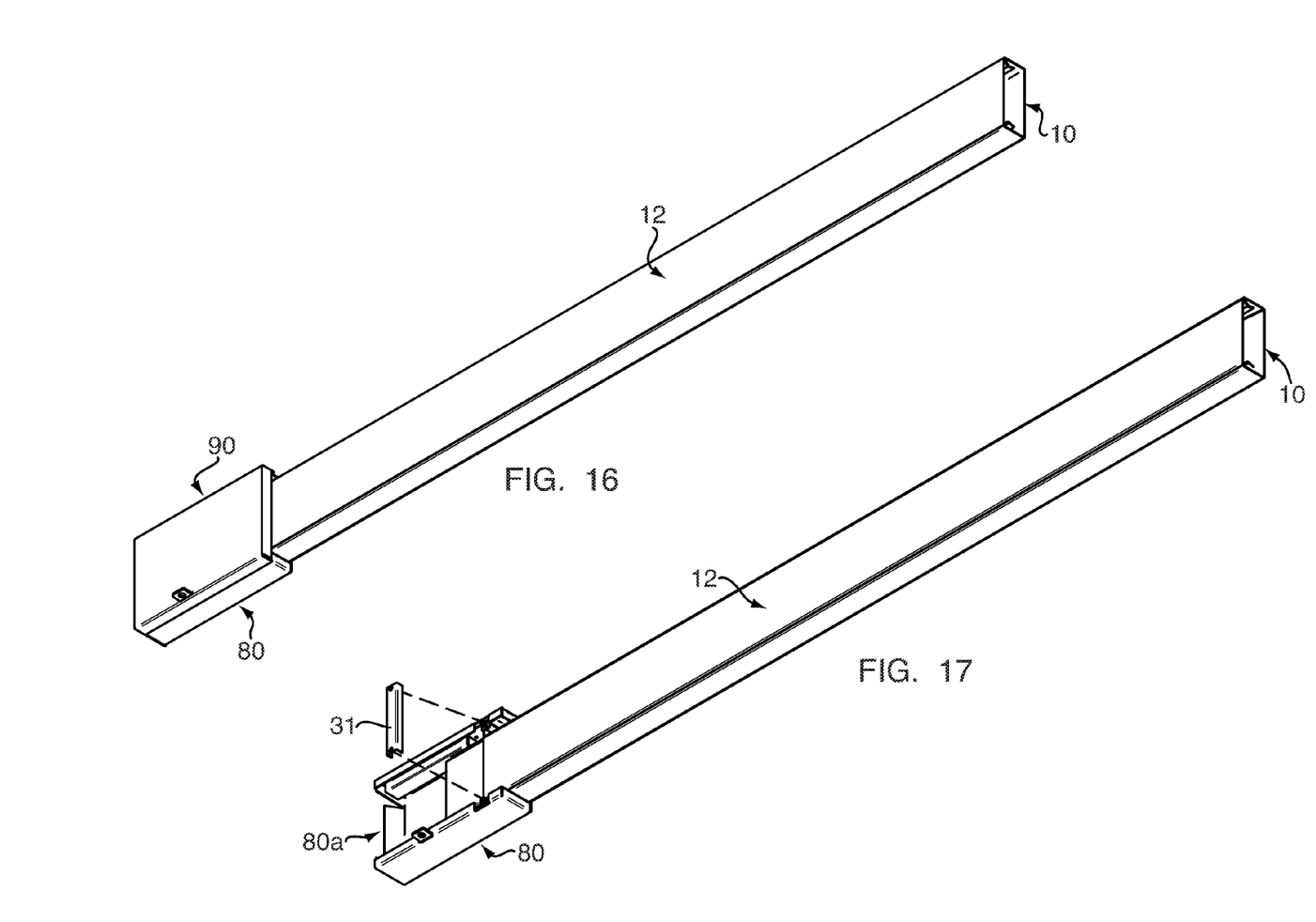
FIG. 16 is a perspective view of an end of the raceway termination box without the box cover, and with the cover clamp not in place.
FIG. 17 is a view of the assembled box of FIG. 16.
Figure 18:
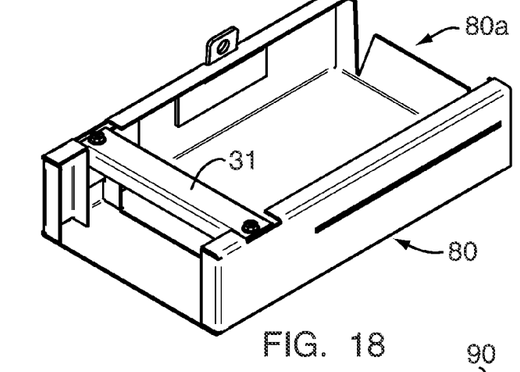
FIGS. 18-21 show details on the box and cover of FIGS. 16 and 17.

Once the cover or covers have been so assembled with an associated base as a result of utilizing the mid-span box of FIGS. 6 and 7, a locking bar similar to that shown in FIG. 17 at 31 can be provided over the assembled raceway base and cover at each end of the mid-span box 20.

Figure 8:
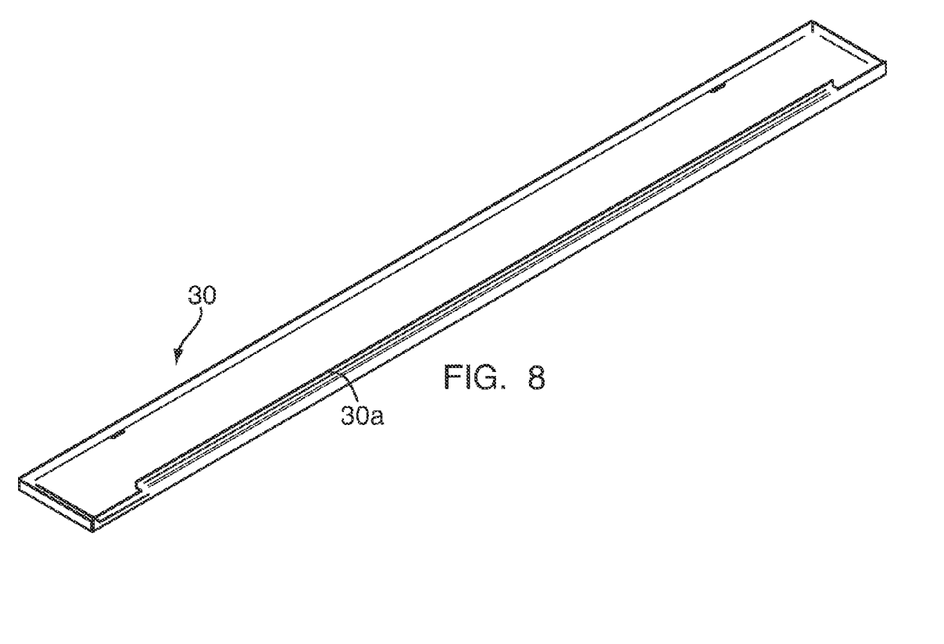
FIG. 8 is a perspective view of the mid-span box cover for use with the mid-span box of FIGS. 6 and 7.
Figure 9:
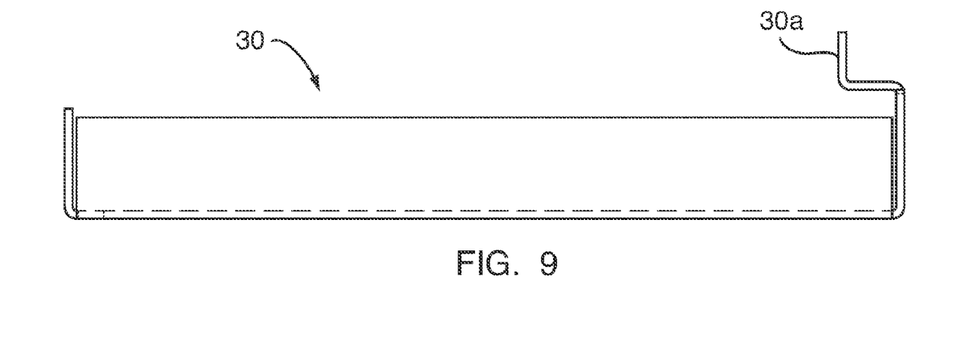
FIG. 9 is a side elevation view of the box cover of FIG. 8.
Figure 10A:
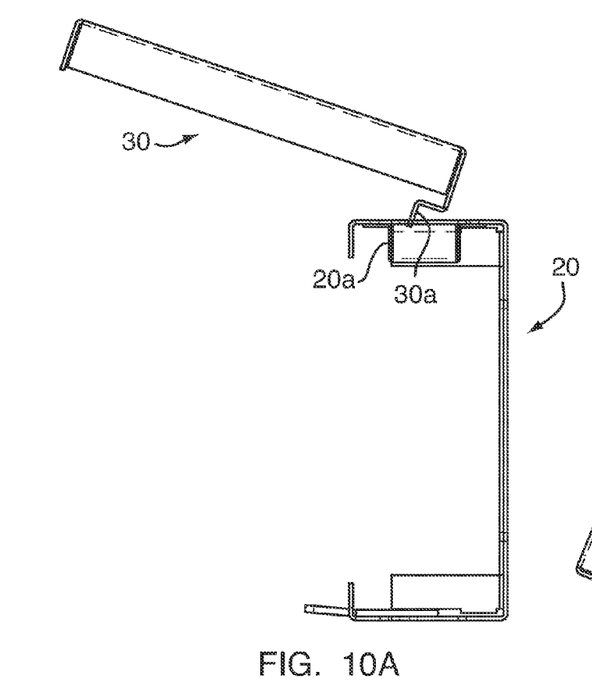
FIGS. 10A, 10B, 10C and 10D illustrate the assembly step for the raceway cover as it is placed over the raceway box, and positioned for placement of a suitable seal device.
Figure 10B:
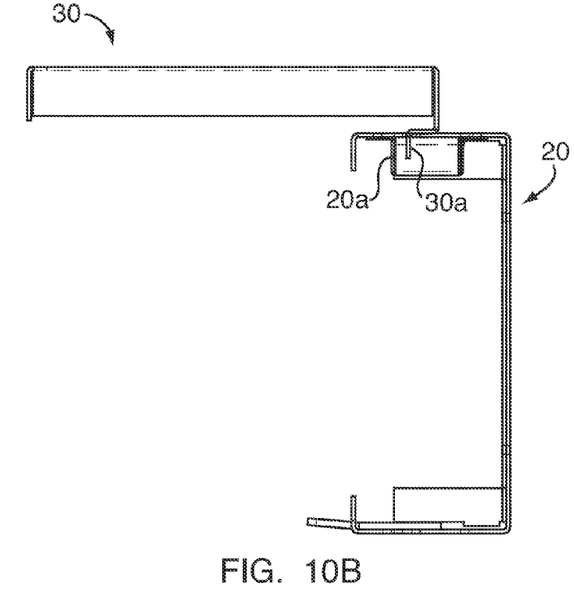
Figure 10C:
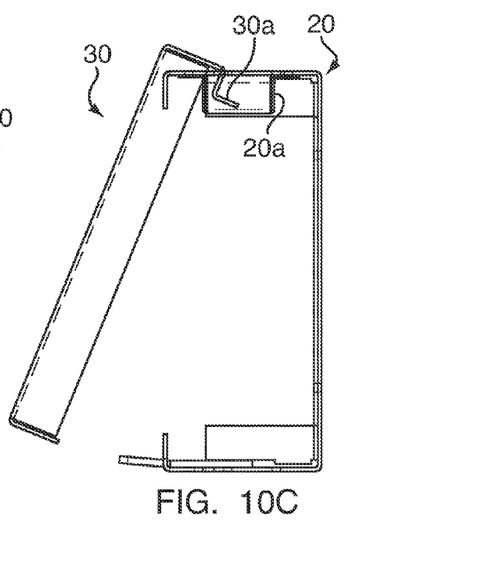
Figure 10D:
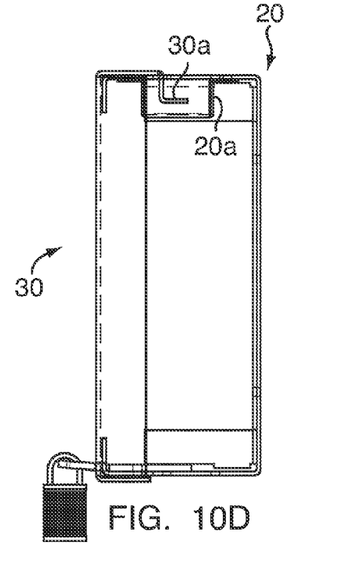

The forwardly open mid-span box 20 must then itself be provided with a cover 30, such as depicted in FIGS. 8 and 9, in the manner suggested for the assembly of the mid-span box and cover as depicted in FIGS. 10A-10D, inclusively.

The mid-span box 20, best shown in FIGS. 6 and 7, has identical configurational geometries provided at either end, and therefore can be used to slide covers either to the left or to the right for assembling a raceway system of the present invention on a wall structure.

Once assembled, with the retaining bars 31,31 screwed in place, the mid-span box cover 30 can be assembled with the box 20 as suggested in FIGS. 10A-10D. The cover 30 has a projecting L-shaped flange 30a at its upper edge for insertion in a slot provided for this purpose on the top of the box 20. The cover flange 30a fits inside an enclosed space defined for this purpose by an enclosure 20a inside the box 20.

Finally, the last step in the assembly process of the mid-span box 20 is to secure the box by means of a padlock, or other suitable locking device.

Figure 11:
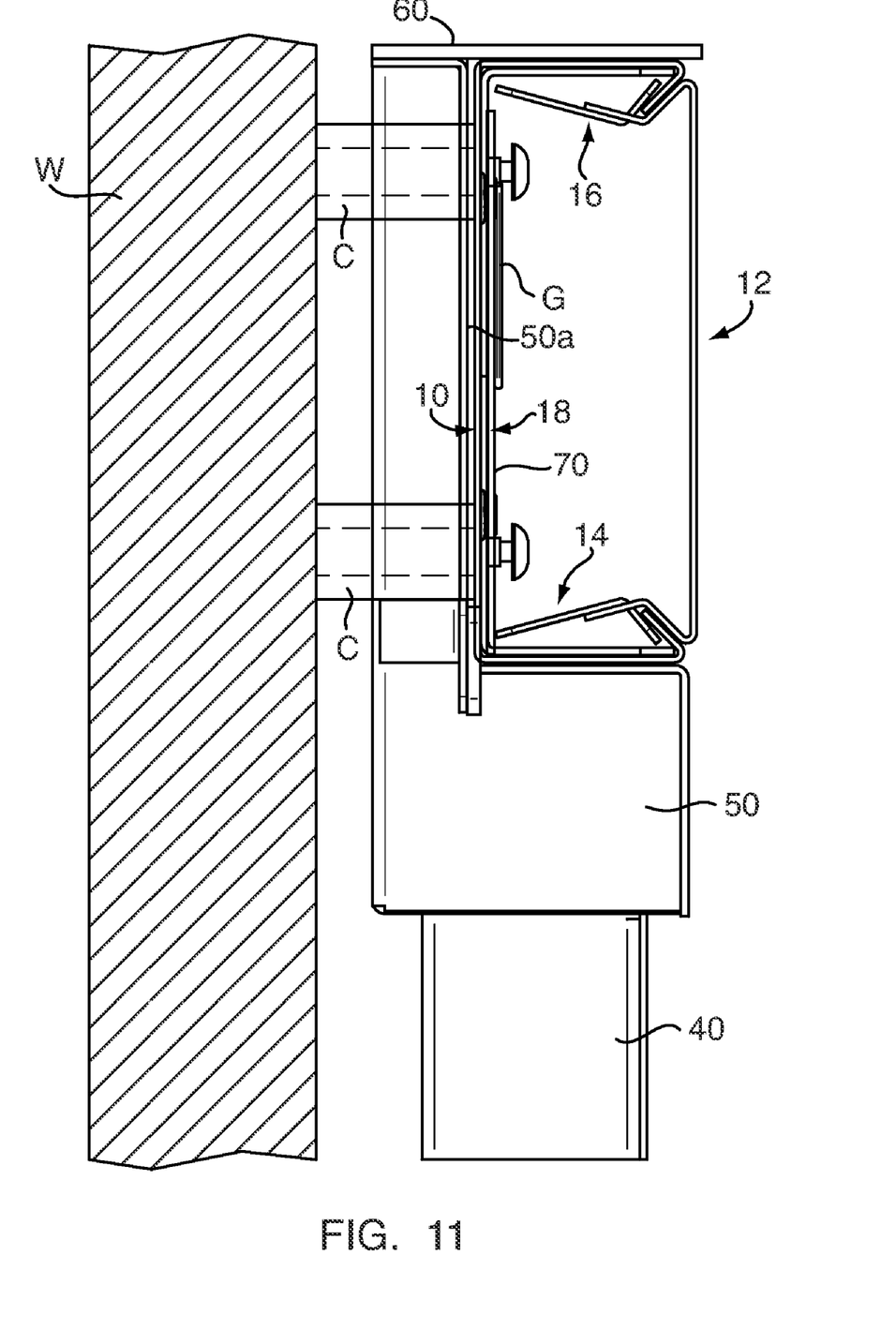
Figure 12:
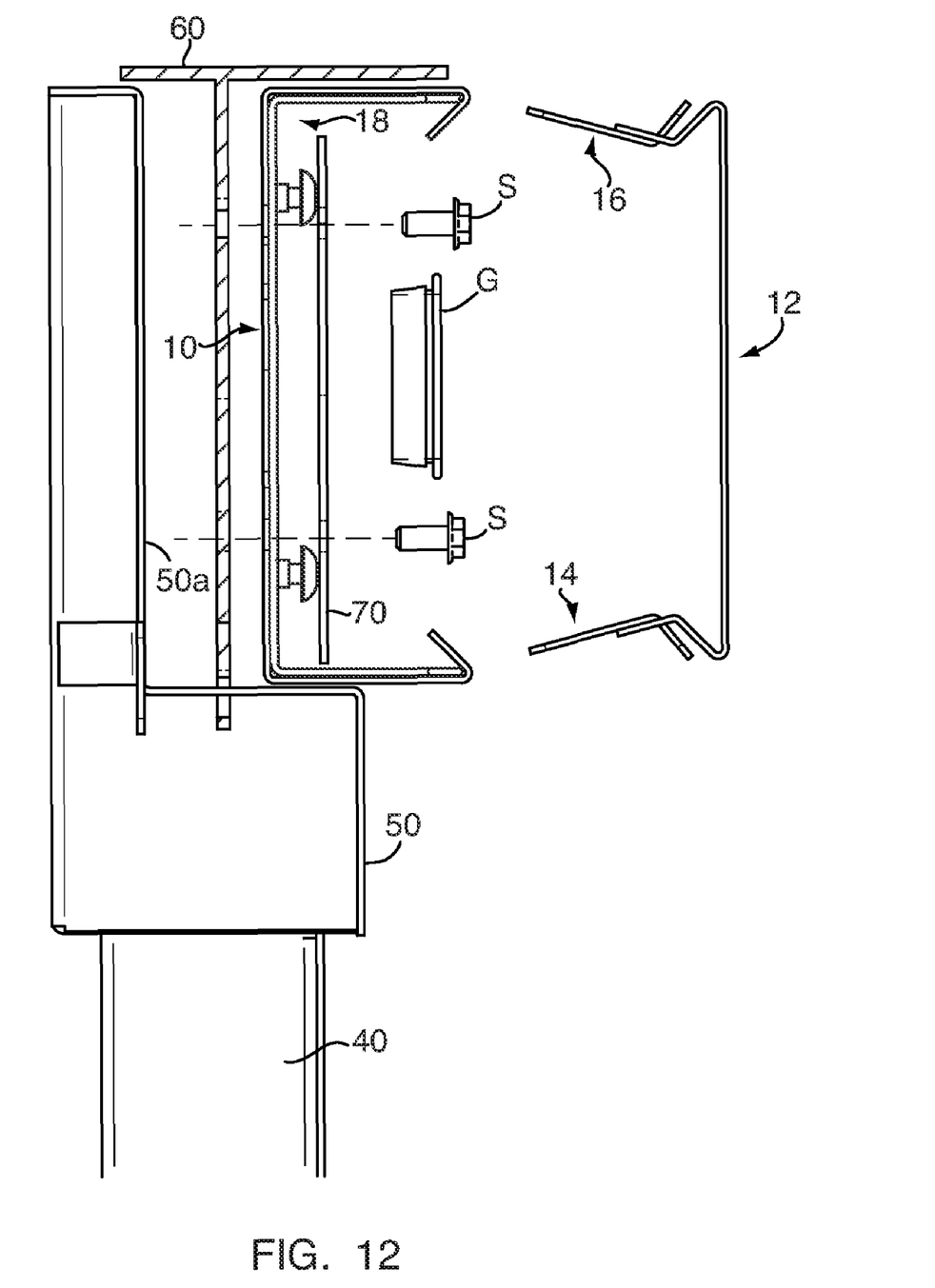
FIG. 12 shows the components of the drop out fitting in FIG. 11, but in exploded relationship to one another.
Figure 13:
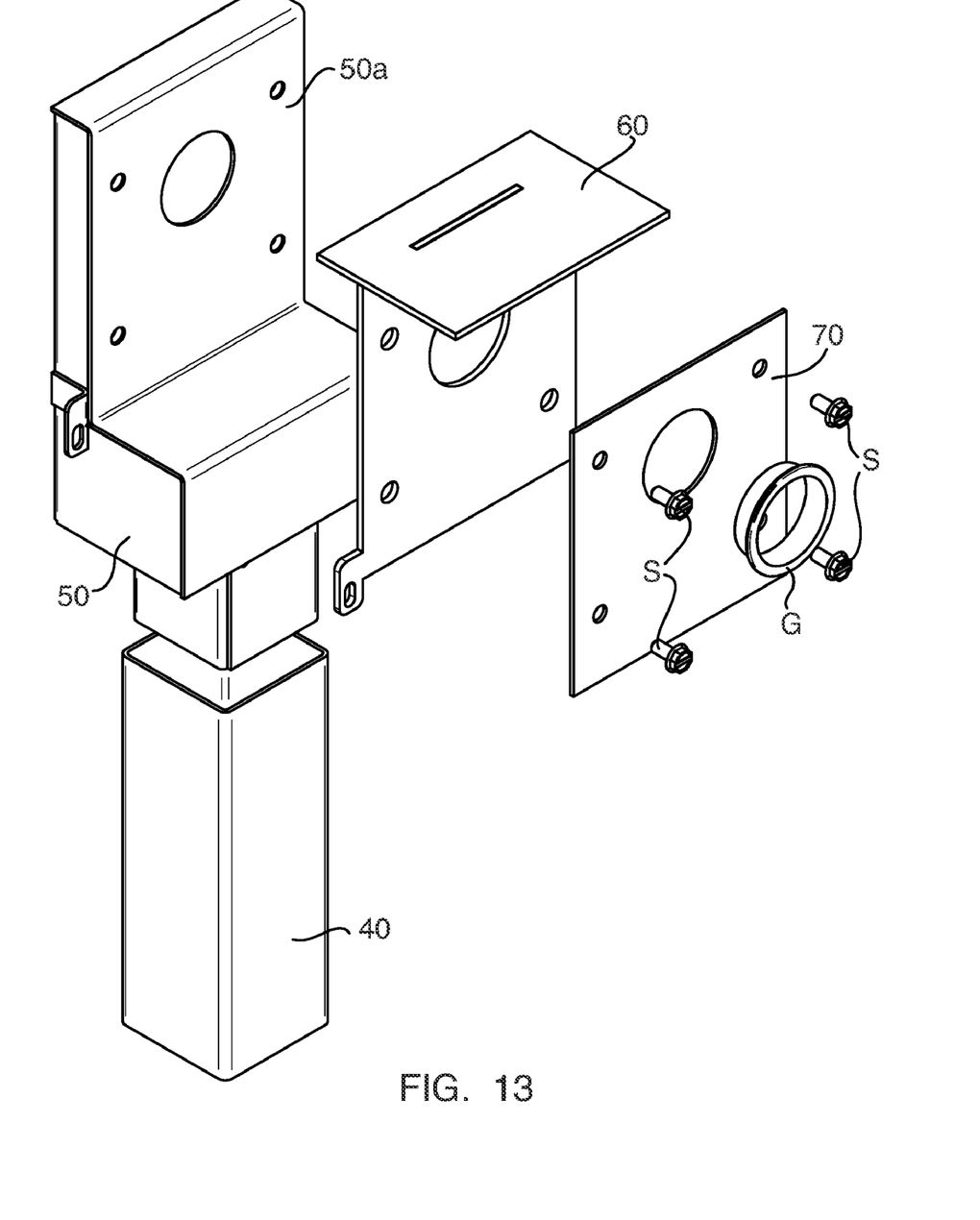
FIG. 13 shows the components of the drop out fitting also in exploded relationship to one another, without the raceway assembly attached thereto.

In order to afford authorized access to the cables within the raceway, at pre-selected work stations, within the work space bounded by the wall structure W, a drop down fitting, such as that illustrated in FIG. 11, is provided in communication with the interior of the raceway for this purpose. The drop down fitting includes a vertically extending tube 40 welded to an L-shaped enclosure 50, as best shown in FIG. 13. The L-shaped enclosure 50 includes a rear leg portion 50a, which fits behind the raceway, as shown in FIGS. 11 and 12. Mounting screws S,S are provided for securing the L-shaped housing 50 to the rear wall of the raceway base. A grommet G is provided to protect the cables running from the interior of the raceway into the drop down fitting housing 50. A T-shaped protective shield 60 is provided between the upstanding leg 50a of the L-shaped housing and the rear wall of the raceway base, as suggested in FIGS. 12 and 13. The interior of the raceway base is provided with a reinforcement plate 70, which serves to further anchor the drop down fitting to the raceway structure.

Figure 14:
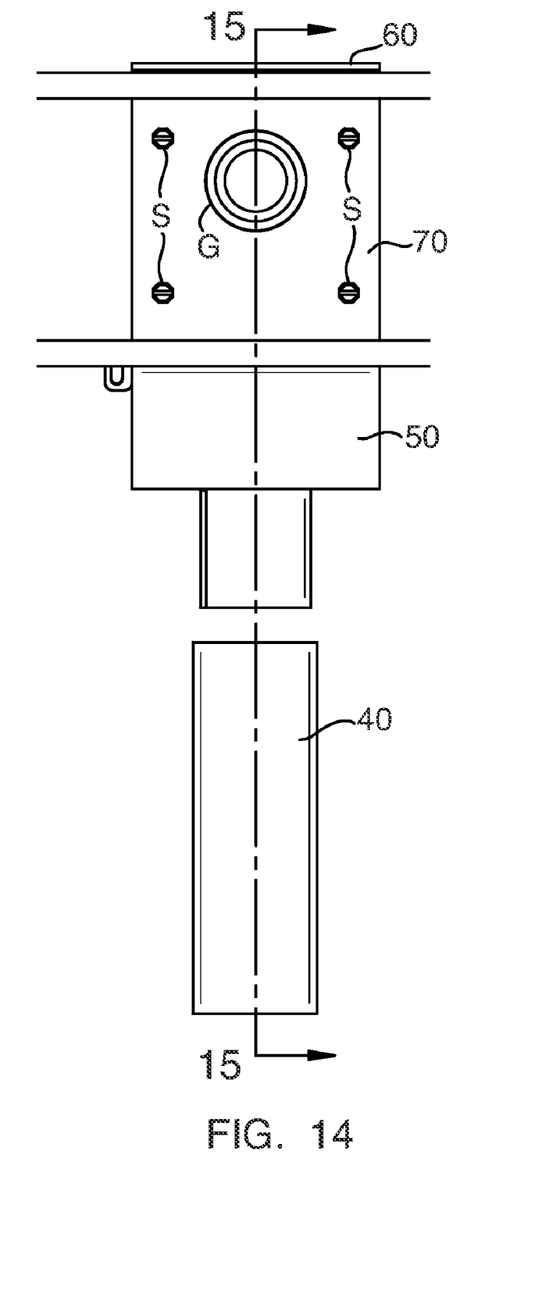
FIG. 14 is a rear elevation view of the raceway and drop-out fitting of FIGS. 11-13.
Figure 15:
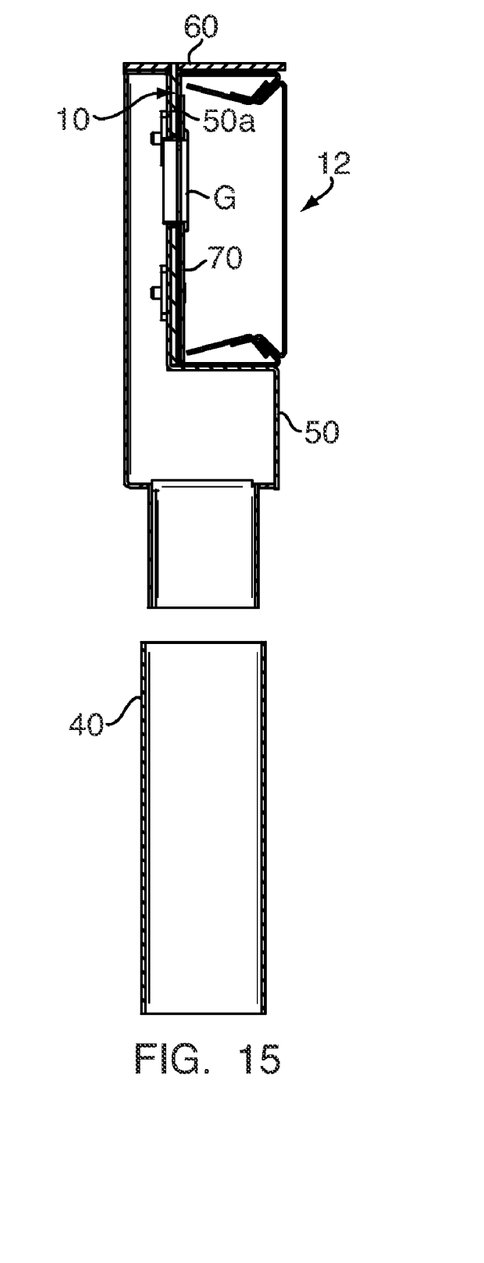
FIG. 15 is a sectional view taken on the line 15-15 of FIG. 14.

FIGS. 14 and 15 illustrate the drop down fitting both from the front and the side, the front view illustrating the raceway cover removed, the sectional view of FIG. 15 showing the raceway cover in place.

Figure 19:
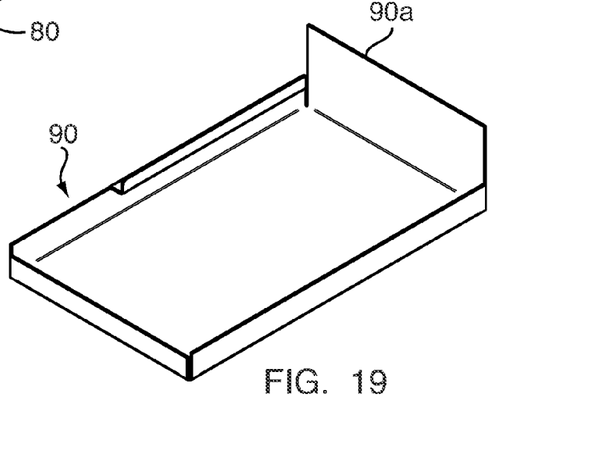
Figure 20:
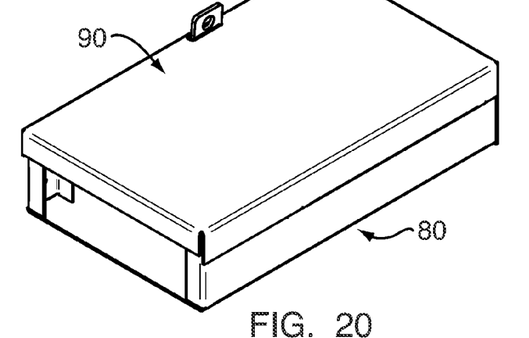
Figure 21:
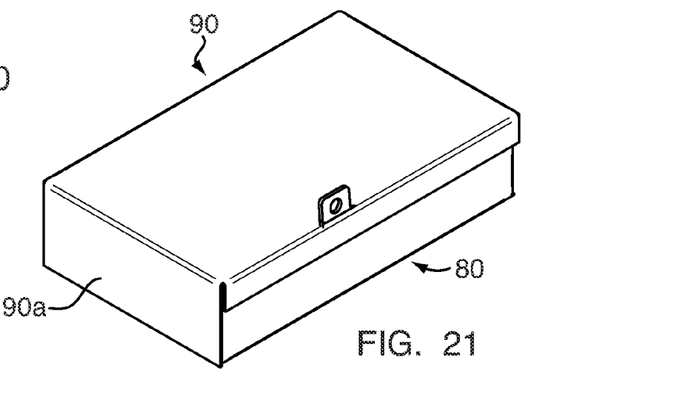

Turning next to a detailed description of FIGS. 16-21, a termination box is shown having a configuration not unlike that of the end portion for the mid-span box 20. More particularly, and as best shown in FIG. 17, the termination box is adapted to receive an assembled raceway base and cover, with a locking bar 31 utilized to anchor these components together. The termination box 80 is fitted with a cover 90 that is adapted to enclose the open end portion 80a of the termination box 80, as best shown in FIG. 19 for example. Thus, the cover 90 includes an end wall 90a which fits together with the end wall of the termination box 80 for this purpose. Finally, the termination box can be secured, as by a padlock (not shown), similar to that described previously with reference to the mid-span box 20.

Figure 22:
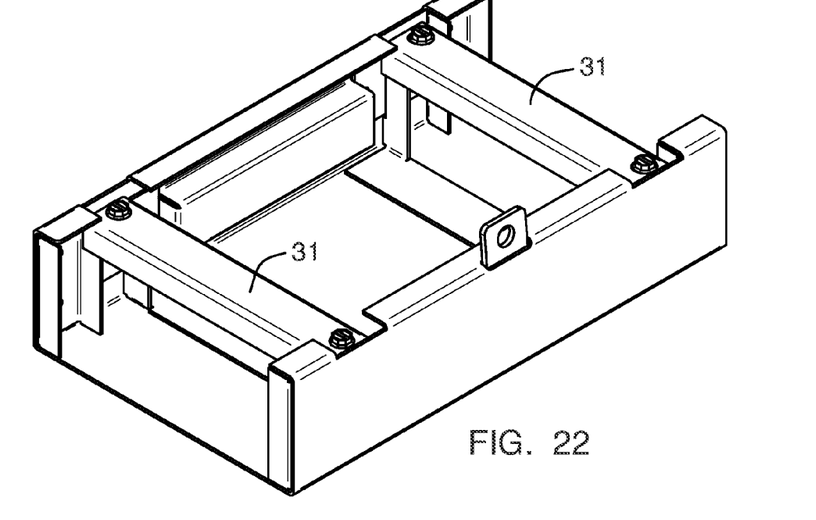
FIG. 22 shows a "slack box" for use between raceway base members that are not butted, and accommodate a gap in their associated raceway covers so the covers can be slid relative their respective base members to provide authorized access to the wireway(s) inside the raceway assembly.
Figure 23:
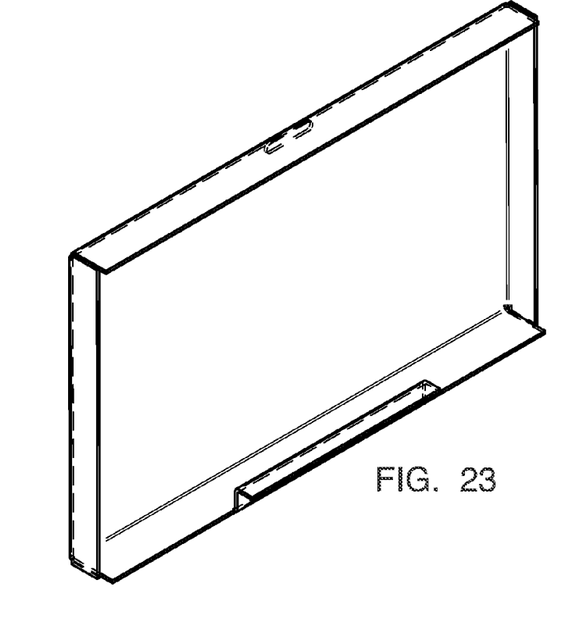
FIG. 23 shows the lockable cover for the "slack box" of FIG. 22.

FIG. 22 shows a "slack" box, the cover being shown in FIG. 23. This box accommodates short gaps in the raceway base/cover installed on walls requiring use of such a box as a coupling device. The structures of the box and cover are similar to the ends of the mid-span box 20 and therefore need not be described in detail. The term access box is adopted in the appended claims to connote any "box" such as the mid-span box 20 or the slack box of FIG. 22, or any box that provides authorized access to the raceway interior. A mid span box might have only one end to connect with the raceway base and cover. The other end can them be made per FIGS. 19-21.

Figure 24:
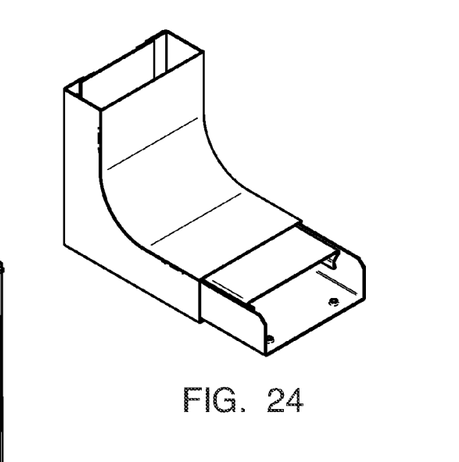
FIG. 24 shows the welded internal corner configuration for use in a secure raceway with lockable access according to the invention.

FIG. 24 shows an internal elbow having a male and female end for use with the raceway and cover assembly described above. This elbow has the same male and female configurations as provided in these raceway/cover assemblies. The male end being fitted with posts that are received in slots provided in the female ends to securely connect these end portions and provide a secure raceway system.

The material from which these raceway system components are preferably formed is metal, and more particularly a rolled sheet steel of at least 1.3 mm thickness for the base, and at least 1.0 mm for the cover and it's clips with the wing portions and the leg portions also of at least 1.0 mm thicknesses. All of these components are preferably galvanized and painted, with a proprietary (SCUFFCOAT) polyester topcoat applied over the painted surface.

What is claimed is:

1. A raceway system comprising; a base having a forwardly open channel shape with side walls that include inwardly and rearwardly projecting marginal edge flanges, a raceway cover having longitudinally extending marginal edges, longitudinally expending clips at said raceway cover marginal edges, said clips having wing portions shaped to fit behind said base marginal edge flanges to restrict movement of said raceway cover relative said raceway base to sliding of said raceway cover endwise in said raceway base, and a raceway base box of length greater than that of said raceway cover, said raceway box having one edge coupled to an end of said raceway base, said raceway base box having a forwardly open front side for receiving said raceway cover.

2. The raceway system according to claim 1, wherein said clips further include rearwardly projecting leg portions having a depth such that the raceway cover is inhibited from being pushed into the raceway base.

3. The raceway system according to claim 1, further including a raceway box cover for closing the open side of said raceway base box that provides access for slidable assembly of the raceway cover, and means for securing the raceway box cover to the raceway base box that allows for visual inspection of that secured connection.

4. The raceway system according to claim 1, further including stand-off collars for mounting the raceway base to a wall structure so that it stands off from that wall structure and allows visual inspection of the entire raceway assembly.

5. The raceway system according to claim 1, further including L-shaped raceway drop out fitting box provided with one leg of the L-shape behind the raceway base between the base and the supporting wall structure, the other leg of the L-shaped drop out fitting box providing a port for feeding wiring through an aligned leg opening in the L-shaped drop out fitting box.

6. The raceway system according to claim 1, further including a termination box for use at an accessible free-end of said raceway base, said termination box receiving said raceway base and cover, and a padlock for locking said termination box.

7. The raceway system according to claim 1, further including a raceway coupler box, one end of said coupler box being capable of receiving said raceway base and cover, and an opposite end of said raceway coupler box also adapted to receive another said raceway base and cover, said coupler box being provided with a lockable lid, and a padlock for locking said lid.

8. The raceway system according to claim 1 further comprising raceway cover coupling connection including a raceway cover clip and a raceway base clip of U-shaped having legs that are oriented parallel said channel shaped base side walls.

9. The raceway system according to claim 1 wherein said raceway base and cover are formed from metal.

10. The raceway system according to claim 9 wherein said metal is steel.

11. The raceway system according to claim 1 wherein said raceway base and cover are formed from metal said base box being of the same metal.

12. The raceway system according to claim 11 wherein said metal is steel.

\* \* \* \* \*